March 19, 1968  J. R. JEROMSON, JR., ET AL  3,373,632
PLASTIC CONTROL CABLE
Filed Jan. 21, 1966
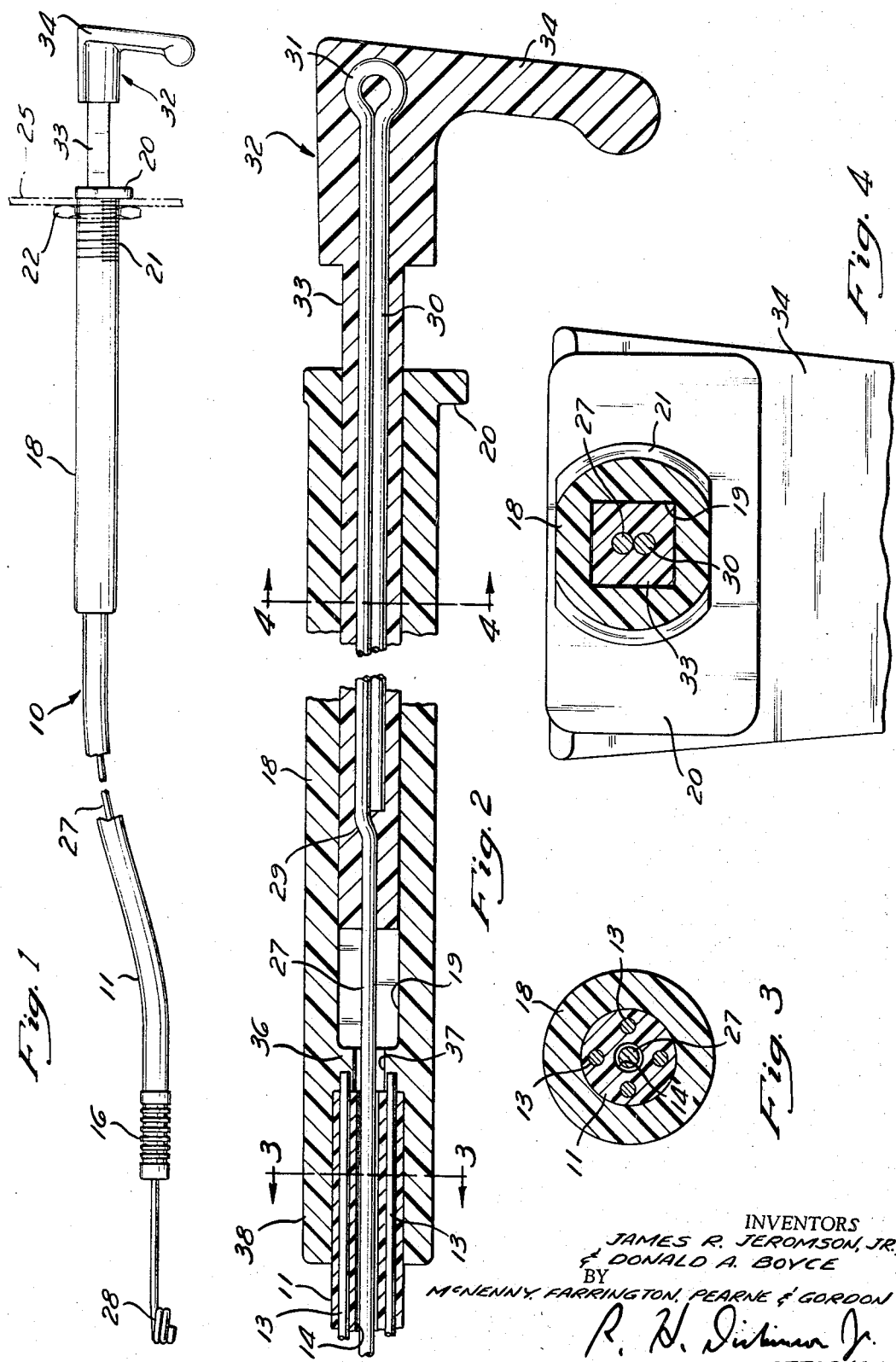
INVENTORS
JAMES R. JEROMSON, JR.,
& DONALD A. BOYCE
BY
McNENNY, FARRINGTON, PEARNE & GORDON
ATTORNEYS United States Patent Office 3,373,632
Patented Mar. 19, 1968

3,373,632
PLASTIC CONTROL CABLE
James R. Jeromson, Jr., Willoughby, and Donald A. Boyce, Chesterland, Ohio, assignors to The Weatherhead Company
Filed Jan. 21, 1966, Ser. No. 522,168
5 Claims. (Cl. 74—502)

ABSTRACT OF THE DISCLOSURE

A push-pull flexible control cable assembly for remote operation of a device is arranged so that the control cable forms a reinforcement for the shaft and knob portions of the assembly to resist bending upon application of axial forces. One end of the control cable is doubled back upon itself and radially offset with respect to the remainder of the control cable for substantially the entire length of the shaft portion of the assembly and is completely encapsulated therein. The point where the control cable begins to double back upon itself defines an eyelet to permanently lock the control cable to the axial movement of the knob.

---

This invention relates generally to a control cable assembly and more particularly to a novel push-pull flexible control cable assembly.

A push-pull control cable assembly generally comprises a flexible curved hollow casing fixed at its opposite ends and a flexible core wire slidably disposed within the casing, one end of the core wire carrying a handle and the other end being connected to a part to be controlled. The support for one end of the casing usually is a housing and the handle includes a shaft portion slidably received within the housing.

In the past, it has been the practice to form the shaft portion of a rigid material such as metal and to secure it to the core wire either by brazing, molding or crimping. In practice, these forms of construction have many disadvantages. Brazing is an expensive process and requires the added step of drilling the ends of the shaft to receive the core wire. Molding requires a metal which is easily molded and commercially suitable metals are relatively weak and brittle. Further, unless the end of the core wire is beaded or otherwise specially prepared, the resulting joint is weak. Crimping also requires the added step of drilling or otherwise specially preparing the end of the shaft to receive the end of the core wire and unless the crimping process is closely controlled, the core wire is often injured and fails at this point.

These joints between the core wire and the shaft of the handle are the weakest points in the control cable assemblies, and should the joint fail, all of the above constructions have the disadvantage of leaving the broken end of the core wire deep within either the casing or the housing, inaccessible for emergency operation.

Another disadvantage of the previous control cable assemblies is that the shaft portions have been free to rotate within the housing when the knob is twisted. This flexes the core wire at the point where it joins the shaft and over a period of time the wire work hardens and eventually fails at this point.

The present invention eliminates these disadvantages by doubling back the end of the core wire upon itself for a substantial length and molding a plastic shaft portion and handle about the doubled back portion, thus eliminating the joint at the end of the shaft and providing an internal reinforcement for the shaft and handle. The core wire is bent into an open loop or eye at the point where it begins to double back upon itself, so that the plastic extends through the eye and forms a positive axial lock between the core wire and the handle. At the same time, twisting of the core wire by improper manipulation of the handle has been eliminated by forming the shaft portion and the housing bore with complementary cooperating non-circular cross sections.

The principal object of the present invention is to provide an improved control cable assembly which overcomes the disadvantages of the previous control cable assemblies and is inexpensive to manufacture.

Another object of the present invention is to provide a control cable assembly wherein the core wire forms a reinforcement for the shaft and knob portions of the assembly.

A further object of the present invention is to provide a control cable assembly wherein relative rotation is prevented between the shaft portion and the housing.

Further objects and advantages of this invention will be apparent from the following detailed description of a preferred embodiment thereof, which is illustrated in the accompanying drawings.

In the drawings:

FIGURE 1 is an elevation view of a control cable assembly embodying the present invention;

FIGURE 2 is an enlarged longitudinal section through the housing and handle of FIGURE 1;

FIGURE 3 is a cross section taken along line 3—3 in FIGURE 2; and,

FIGURE 4 is a cross section taken along line 4—4 in FIGURE 2.

Referring to the drawings in greater detail, the illustrated preferred embodiment of the present invention is adapted for use in the ventilation control system of an automobile.

The control cable assembly 10 includes a flexible reinforced hollow jacket 11 substantially circular in cross section and formed of a suitable flexible plastic material such as a linear polyethylene plastic. Embedded within the jacket 11 are a plurality of longitudinally extending reinforcing wires 13. A central passage 14 extends the entire length of the jacket 11.

As seen in FIGURE 1, the left hand end of the jacket is encased in a metal ferrule or cap member 16 crimped onto the jacket with a series of grooves adapted to be engaged by a clamp to secure the jacket against axial motion on a bulkhead or other fixed part. Any other suitable clamping means to secure the end of the jacket may be used if desired.

Secured to the opposite end of the jacket 11 is a housing member 18 which may be formed of any suitable material, preferably the same linear polyethylene plastic of which the jacket 11 is formed.

The housing 18 is provided with an axial bore 19 having a non-circular cross section which may be rectangular, as illustrated. The bore 19 terminates in a wall 36 having a circular axial opening 37 with a diameter equal to or slightly larger than the passage 14 in the jacket 11. Beyond the wall 36 the housing 18 has an end portion 38 embracing and securing the adjacent end of the jacket 11. The portion 38 may be fastened to the jacket 11 in any suitable way, but in the preferred embodiment the housing is molded directly to the end of the jacket and the protruding ends of the reinforcing wires 13, forming a tight bond to the outer surface of the jacket 11 through an axial length of about 2½ diameters.

The opposite end of the housing 18 is provided with a radial flange or escutcheon 20 and a suitable fastener engaging means such as the illustrated threads 21. When one end of the control cable assembly is mounted on a wall or panel, as shown in phantom at 25 in FIGURE 1, the flange 20 is secured against one side of the wall by a suitable fastener such as the illustrated nut 22 located on the opposite side of the wall which cooperates with the threads 21.

A core wire 27, preferably steel piano wire, is slidably disposed within the jacket passage 14 and the housing opening 37 with its opposite ends extending beyond the ends of the jacket 11 and the housing 18. A pigtail 28 is provided on one end of the core wire 27 for connecting the control cable assembly to the device to be operated. The other end of the core wire 27 is offset at 29 and doubled back upon itself for a substantial distance as indicated at 30. An open loop or eye 31 is formed at the point where the core wire begins to double back upon itself.

A combined shaft and handle member 32 is molded as an integral unit about the doubled back portion 30 of the core wire 27. The member 32 may be of any suitable moldable material, preferably a linear polyethylene plastic. The member 32 includes a non-circular shaft portion 33 complementary in cross section to the bore 19 in which it slidably fits. The major extent of the doubled back portion 30 is encased in the shaft portion 33 which extends axially beyond the offset 29 for a sufficient distance to prevent flexing and cold working of the wire. By offsetting the core wire at 29, the double back portion 30 is symmetrical with the remainder of the core wire and easily centered with the shaft portion during the molding process.

A shaft portion 33 terminates in a handle portion 34 which is molded about the eye 31. Forming the eye 31 rather than a sharp closed bend at the end of the core wire not only minimizes breakage of the wire during forming, but also provides a hole through which the material of the handle member passes to permanently lock the member 32 against axial movement relative to the core wire.

The control cable construction embodying the present invention not only eliminates the vulnerable joint between the end of the core wire and the end of the shaft, but also provides an internal reinforcement for the shaft portion. This construction is simple and inexpensive to manufacture, in addition to being mechanically stronger and more reliable than the previously available control cable assemblies.

While the preferred embodiment of the invention has been described in considerable detail, it is to be understood that many rearrangements and modifications may be resorted to without departing from the scope of the invention as defined in the following claims.

What is claimed is:

1. A control cable assembly comprising a hollow jacket member, a hollow housing member secured to one end of said jacket member, a core wire slidably received within said jacket and housing member having an end portion adjacent to said housing member, and a core member having a shaft-like portion slidably received within said housing and a handle portion for manipulating said core wire, said end portion of said core wire being doubled back upon itself for substantially the entire length of said core member and completely encapsulated within said core member.

2. A device as set forth in claim 1 wherein an eyelet is provided at the point where said end portion of said core wire begins to double back upon itself, said eyelet being encapsulated within said core member.

3. A device as set forth in claim 1 wherein said jacket member and said core member are of resilient flexible plastic materials.

4. A device as set forth in claim 1 wherein a portion of said core wire is radially offset with respect to the remainder of the core wire for substantially the entire length of the core member and completely encapsulated therewithin, and said doubled back portion lies adjacent said offset portion.

5. A push-pull control cable assembly comprising a jacket of flexible resilient plastic material defining a longitudinal passage extending the length thereof and having a plurality of longitudinally extending reinforcing wires embedded therein, a housing having one end secured to said jacket, said housing defining an axially extending non-circular bore aligned and communicating with said passage, said housing having an external flange on the other end thereof and means adjacent said flange for engaging a fastener means to secure said housing to a wall, a core member having an integral combined shaft and knob member of a moldable material with the shaft portion extending axially from the knob portion, said shaft portion of said member being slidably received within said bore and having a non-circular cross section complementary to said bore, a flexible resilient core wire slidably disposed within said passage and extending beyond the ends of said jacket and housing, one of said core wire being doubled back upon itself defining an eyelet at this point with the doubled back portion overlying said core wire for substantially the entire length of said core member and completely encapsulated therewithin, said knob portion of said core member surrounding said eyelet and having a larger radial extent than said shaft portion.

References Cited

UNITED STATES PATENTS

| 1,918,729 | 7/1933 | Arens | 74—502 |
| 2,304,356 | 2/1942 | Heller. | |
| 2,461,378 | 2/1949 | Grose | 74—501 X |
| 2,787,917 | 4/1957 | Schroeder | 74—502 |

FOREIGN PATENTS 1,015,839  8/1952  France.

MILTON KAUFMAN, *Primary Examiner.*

FRED C. MATTERN, *Examiner.*

C. F. GREEN, *Assistant Examiner.*